US012424068B2

(12) United States Patent
Coyle et al.

(10) Patent No.: US 12,424,068 B2
(45) Date of Patent: Sep. 23, 2025

(54) MULTILEVEL FIRE DETECTOR

(71) Applicant: Brian Michael Coyle, Canyon, CA (US)

(72) Inventors: Brian Michael Coyle, Canyon, CA (US); Alys Larsen, Canyon, CA (US)

( * ) Notice: Subject to any disclaimer, the term of this patent is extended or adjusted under 35 U.S.C. 154(b) by 0 days.

(21) Appl. No.: 18/885,464

(22) Filed: Sep. 13, 2024

(65) Prior Publication Data

US 2025/0095467 A1 Mar. 20, 2025

Related U.S. Application Data

(60) Provisional application No. 63/538,287, filed on Sep. 14, 2023.

(51) Int. Cl.
*G08B 17/00* (2006.01)
*G08B 17/06* (2006.01)

(52) U.S. Cl.
CPC ........... *G08B 17/005* (2013.01); *G08B 17/06* (2013.01)

(58) Field of Classification Search
CPC ...... G06N 3/08; G08B 29/185; G08B 17/005; G08B 17/06
See application file for complete search history.

(56) References Cited

U.S. PATENT DOCUMENTS 4,329,682 A * 5/1982 Baker .................... G08B 19/02 340/581
5,288,147 A * 2/1994 Schaefer ................ G01K 17/00 374/10
6,443,003 B1 * 9/2002 Bailis ...................... G01F 1/684 73/204.12
6,853,452 B1 * 2/2005 Laufer ................. G01N 21/314 356/438
7,258,482 B2 * 8/2007 Hutter .................... G01K 7/021 374/E7.004
9,103,730 B2 * 8/2015 Stockert ................... G01K 7/04
9,599,522 B2 * 3/2017 Caroff ..................... H10N 10/01
9,696,457 B1 * 7/2017 Mattes .................. G01J 5/0025
9,964,454 B2 * 5/2018 Danley .................. G01N 25/20
10,217,891 B2 * 2/2019 Israelowitz ............. H10F 71/00
11,322,007 B2 * 5/2022 Fischer ................. G01J 5/0066
11,475,757 B1 * 10/2022 Alessi .................. G08B 25/007
2001/0006367 A1 * 7/2001 Oda ....................... G08B 13/19 340/567
2004/0129434 A1 * 7/2004 Tan ........................ A62C 37/40 239/69
2005/0034749 A1 * 2/2005 Chen ......................... G01J 5/12 374/E7.016
2005/0141588 A1 * 6/2005 Robertson .............. A44C 17/02 374/45
2009/0199773 A1 * 8/2009 Jurk ..................... A01K 5/0225 119/57.91

(Continued)

*Primary Examiner* — Hoi C Lau

(57) ABSTRACT

A multilevel fire detector system includes a vessel with low-cost thermoelectric sensors such as thermopiles, facing multiple directions, that amplify infrared (IR) wavelengths particular to wildfire. A controller processes and compares IR data patterns in various ways and determines if potential fire risk or heat surges exceeds a threshold, which is a function of on-board and external data, then produces a warning signal transmitted by a communication system. The system may be deployed on its own, or configured with infrastructure, including transmission lines implicated in wildfires.

5 Claims, 13 Drawing Sheets

(56) References Cited

U.S. PATENT DOCUMENTS

| | | | | |
|---|---|---|---|---|
| 2012/0235579 | A1* | 9/2012 | Chemel | F21V 15/01 315/152 |
| 2015/0379845 | A1* | 12/2015 | Fischer | G01J 5/0018 250/338.3 |
| 2017/0062645 | A1* | 3/2017 | Israelowitz | H10F 30/221 |
| 2018/0182218 | A1* | 6/2018 | Toland | H04W 4/38 |
| 2019/0170791 | A1* | 6/2019 | Hetzler | G01R 1/203 |
| 2019/0237226 | A1* | 8/2019 | Hetzler | G01R 19/32 |
| 2020/0367692 | A1* | 11/2020 | Stipe | G06V 20/52 |
| 2022/0101707 | A1* | 3/2022 | Pole | G08B 17/107 |
| 2022/0335800 | A1* | 10/2022 | Honigsberg | H10N 10/17 |
| 2023/0152157 | A1* | 5/2023 | Ekkel | G01J 5/12 315/297 |
| 2023/0157173 | A1* | 5/2023 | Oh | H10N 19/00 136/230 |
| 2024/0079905 | A1* | 3/2024 | Majewski | H02J 50/001 |
| 2025/0095467 | A1* | 3/2025 | Coyle | G08B 17/005 |

* cited by examiner

MULTILEVEL FIRE DETECTOR

CROSS-REFERENCE TO RELATED APPLICATIONS

The present application claims benefit under 35 USC § 119(e) of U.S. Provisional Patent Application Ser. No. 63/538,287 filed on 14 Sep. 2023. The present application is based on and claims priority from this application, the disclosure of which is hereby expressly incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND

Fire Beetles

Pyrophilous jewel beetles, *Melanophila acuminata*, are attracted to forest fires from distances of more than 60 km. Their bodies are equipped with infrared (IR) receptors. Scientists estimate that in the great Coalinga fire of 1924 the beetles were attracted from a distance of 130 km (80 miles.) At that distance IR light should be attenuated to the point of getting lost in stochastic sensor noise, assuming the sensitivity of existing IR sensing technology.

The beetle IR receptors, however, do not detect light. Sometimes mistaken for complex eyes, each group is composed of about 70 dome-shaped sensilla, and each group is on a leg facing a direction different from other groups on other legs. Each sensillum is a cuticular lens-like sphere, with a 12-15 μm diameter, covered by a thin membrane of about 1 μm. Each sphere is innervated by one bipolar neuron. The receptors are thermal detectors, in which slight warming causes membrane deformation of 1-10 nm, which elicits a nerve response (Vondran, et al., 1995, 1. ) Membrane deformation, not light perception, triggers response.

*M. acuminata*'s sensilla contain Zinc phosphide proteins sensitive to IR. This inspired U.S. patent application Ser. No. 14/272,801 of Israelowitz et al. (P1) to use them as a model for synthetic proteins for an infrared microchip. Their goal was to create multiple electrode gaps on a chip with these proteins. Because Zinc phosphide absorbs most of the infrared spectrum, the authors posit their proteins will be highly sensitive to many emission sources, ideal for infrared cameras. The '801 application teaches "single needles of Zinc phosphide crystals" grown as nanowires and placed in a "preformed electrode gap" to form semiconductors.

There is a need to utilize *M. acuminata*'s strategy of heat detection for forest fire detection. The key component is not the identity of a particular protein, but the evolutionary strategy of a multi-directional IR detector. Current wildland IR fire detection, whether earth, atmospheric, or space-based, use IR cameras. Contemporary IR cameras configure thermoresistors across a two dimensional surface (sometimes called a focal plane array.) Each resistor is precisely positioned so that the ensemble generates a 2D image. For example, U.S. Pat. No. 12,069,387 to Sano & Ye (P2) teaches that its focus is not in a narrow direction, but a scenic one. Their components, manufacturing, and operation are expensive. They consume a lot of energy. The intention of an IR camera is to generate a picture of the incoming intensity of a range of frequencies. IR sensors based on indium gallium arsenides (InGaAs) provide good responsivity from about 900 nm to 1700 nm. Because of this range, they are used in IR cameras. InGaA is expensive, low-resolution, and requires low temperatures to function. They require a cooling system, such as a Peltier cooler, which increases electricity consumption.

The cost, operational complexity, and energy requirements of IR cameras limits their deployment in wildland fire detection purposes. University of California San Diego developed AlertCalifornia with Cal Fire, training a program to detect smoke and other early indications of fire on a feed from a network of more than 1,050 cameras placed in forests across the state. The system faces a bottleneck, however. Images with adequate rendition require high-cost IR cameras with detection capacity of about one mile. 1,050 cameras can cover around 0.05% of California's forests. Delicate IR camera operations are not suited to wildland climate conditions, which have wide temperature fluctuations, precipitation, wind, and biotic forces. Isolated, expensive equipment is vulnerable to theft. The resale market for IR cameras is large and unregulated (Govil, et al., 2020, 2. )

IR cameras are not particularly sensitive to the particular IR wavelengths that fires produce. Their scenic view reduces the sensitivity in a specific direction. IR cameras array thermocouples in parallel, each information quota separately displayed. Besides their costs and special operating procedures, IR cameras require transmission of their entire detection to management facilities, usually via satellite. As cameras are limited to line-of-sight detection, only a fraction of forested, fire-prone areas can be monitored.

Affordable fire detection systems have only been invented for residential or commercial buildings and their environments, as described in U.S. patent application Ser. No. 15/905,377 of Toland (P3). There is a need to detect wildfires before they spread, using a low cost, robust, resilient, IR detector source.

Thermopiles

This invention uses thermopiles, and thermoelectric sensors generally, as energy detecting sensors. A thermopile is an instrument consisting of 10 to 103 thermocouples assembled in series, not on a planar focal array. The thermocouples are bundled on the same small surface, serially connected to increase signal to noise ratios. Thermocouples use two materials in a junction pair. Each material responds differently to heat. One, called the reference, is kept at a known temperature, the other, called the active, varies in response to heat. The measured difference (in voltage) detects incident radiation. As described in U.S. Pat. No. 5,288,147 to Schaefer & Danley (P4) connecting junction pairs in series increases their responsivity by the number of pairs; if each thermocouple produces 2 volts, a thermopile with 100 thermocouples produces 200 volts. Themopiles distribute incident thermal energies efficiently to each thermocouple. They are particularly sensitive to IR radiation, but their measurement is usually limited to a narrow range within it. This is not suitable for image-making, but is optimal for detecting specific radiation sources, such as fires, which radiate a narrow spectral range (Bordbar, et al. 2022, 3. ) The thermopiles used in this invention amplify the specific wavelengths that fires emit.

The thermocouples arrayed in series in a thermopile are summed as a "stack". Compared to an IR camera, it's as if all the thermocouples are pointing at the same landscape point, at the same pixel of planar data. The root mean square error of stacked sensors is reduced by about the square root of the number of thermocouples in the thermopile, compared to a single resistor on a planar image plane. For a 200 resistor thermopile, RMS is reduced by about 14 times compared to the single resistor; for an 800 resistor stack, RMS is reduced 28 times, compared to a resistor in a parallel camera array. Thermopiles are able to detect signals attenuated 102 more than the lowest threshold of IR cameras.

Thermopiles have not been deployed in outdoor IR fire detection. They are generally dismissed for outdoor purposes because if the difference between reference and active temperatures exceeds tens of degrees, junctions can fail. But detection of distant wildland fire does not increase the active junction by anywhere near this amount. There are two other problems with thermopiles. 1) The response time of thermopiles is considered slow, compared to other thermometer systems. It may take 10 milliseconds or longer for a thermopile to register an IR signal. While important in emergency or industrial operations, such a lag is irrelevant for wildland fire detection. 2) Because humans and animals emit IR, devices can easily be affected by their presence. However biological IR sources are limited in radiation extent; mounting thermopiles well above ground, with attributes that discourage bird landing, prevents animals and people from interfering with thermopile response.

This invention is a fire detector, not a camera. Humans understand visual information quickly, which IR cameras provide. IR cameras produce precise pictures, but attenuation loss limits these to about one mile line of sight distances. Thermopiles do not provide a precisely targeted source of IR radiation at distances greater than three miles, but can detect the general orientation of the signal an order of magnitude more distant. The logic of jewel beetles used in this invention compares IR detectors oriented in different three-dimensional directions to estimate a fire's location. There are a number of statistical methods to reduce noise and isolate a signal in the output of multiple sensors in the same orientation direction. There is a need to apply statistical methods to analyze energy detected from sensors facing different directions.

Further, although not a subject of published scientific research, the inventor's personal research suggests it is likely that some IR transmittance through leaves occurs. Satellites do not detect this, yet this may be because most temperate trees have planar, horizontal leaf orientations. IR obliquely reflects off these, whereas visible light deflects, up, down, or backscatters. Fire sources emit mid-infrared light (MIR) rather than near-infrared light (NIR.) When a leaf presents to a light wave at an oblique angle, more of the surface is intersected. Surface roughness increases. Visible & NIR wavelengths deflect more than MIR, because wavelengths larger than roughness features do not deflect.

Light transmittance studies measure visible light. Models showed limited transmittance through dense tree stands, especially structurally heterogeneous stands. However MIR may transmit through stands of trees with horizontal (planophile) or plagiophile (oblique) leaf angles. The leaf angles of 58 common deciduous tree species over several seasons were measured, at multiple heights. 30 had planophile leaves, 13 had plagiophile. Only 5 were close to spherical, with as many vertically as horizontal Reflectance off relatively planar leaf distributions increases more or less linearly with wavelength (Pisek, et al., 2013, 4. ) Tabulating average planophile leaf angle found in the literature, transmittance more than doubles for MIR compared to visible and NIR. Leaf canopies may serve as conduits for long wavelengths, extending the range of the invention.

SUMMARY OF THE INVENTION

In the following, the invention is referred to as a Multi-level Fire Detector (MFD), or MFD system. Thermopiles and thermopile variants such as thermopile bolometers or pyrodetectors are referred to as "thermoelectric sensors" "sensors" or "thermopile sensors", and thermocouples are referred to as "thermocouples" or "resistors". The phrases "interacts" or "interactions" as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely, including off-site through a communication system. The term "communication system" refers to a wired, wireless, optical, or other communication link that transports transitory electrical or other signals. Descriptive and directional terms such as "common spatial orientation" or "spatial orientation" or "orientation" or "facial direction" or "direction" as well as derivatives thereof, refer to a physical direction faced by vessel sides or sensors relative to a three dimensional surface of the earth. The terms "fire signals" or "signals" or "IR energy pattern data stream" or "wavelengths" or "data" or "data stream" or "radiation" or "energy" or "energies" or "IR energies" as used herein refer to any data that contains information or noise whether in electromagnetic, physical, numeric, alpha-numeric, or other form that may be transmitted through space. In particular, an "IR energy pattern data stream" refers to a recurring structure, trend, or behavior in an IR data stream over time, or a familiar pattern of multiple IR data streams at the same time.

The term "typical data", "typical IR energy pattern data" and "stored data" refer to data generated by a record of IR energy pattern data in a specific direction, correlated with time of day, year, weather, etc., as well as selected data which may be provided by sources such as weather stations and weather prediction models, the selected data transformed using statistical features to predict IR energy pattern data. Satellite IR data is commonly transformed to predict weather; for example, specific IR wavelengths correlate with raindrops, with the phase state of water condensate, with atmospheric and land temperature; these data provide a database of IR energies that predict different weather, which may be used in the generation of typical data. A sensor fusion controller collects data outputs from resistors and sensors, and a processor algorithm fuses the data outputs, which may include typical data, to generate an initial estimation of the probability of a fire risk or heat surge.

In an embodiment, an MFD system detects a fire risk or heat surge by measuring a plurality of IR energies incident upon a first plurality of sensors that are pointed in at least a first common spatial orientation, and a second plurality of sensors that are pointed in at least a second common spatial orientation. The sensor fusion controller compares a pattern of IR energies measured by the sensors pointed in the first common spatial orientation with a pattern of IR energies of the sensors pointed in the second common spatial orientation. The sensor fusion controller calculates if a difference in measured IR energy patterns is determinative of a fire risk or heat surge. The MFD system transmits information through a communication system to parties concerned with fire risk or heat surge, such as a management center.

In an embodiment, an MFD system is a vessel, with at least a first side facing a first common spatial orientation, with multiple IR sensors disposed on each side pointing in a generally facial direction of that side, with a direction measurement system such as a magnetic compass, GPS compass, an inclinometer, a gyroscope or multiple gyroscopes, the direction measurement system providing a measurement of compass azimuth and altitude that ensures the direction faced by each side of the vessel is updated in an orientation data, the multiple sensors disposed on each side each producing an IR energy pattern data stream associated with the orientation data and transmitted to a controller, the controller stores typical IR energy pattern data associated with the orientation data, the controller includes a sensor fusion algorithm that processes the IR energy pattern data streams, the orientation data, and the typical IR energy pattern data, and determines if there is a detection of a fire risk or heat surge.

In an embodiment, an MFD system compares a pattern of IR energy pattern data detected by IR sensors pointing in specific directions, with a pattern of typical IR energy pattern data oriented in those specific directions stored in a controller, to detect a fire risk. Patterns of typical IR energy pattern data are generated by a record of IR energy pattern data in a direction, as well as time of day, time of year, solar and luna cycles, weather, climate, cloud cover, atmospheric conditions, and the like. In an embodiment, the typical IR energy pattern data is updated with the IR energy pattern data detected by IR sensors.

In an embodiment, an MFD system may use spectral analysis, particularly in the sensor fusion controller, especially to confirm a detected fire. This is much more cost-effective and energy-efficient than applying spectral analysis to every data stream from an IR camera or sensor.

In an embodiment an MFD system is a 360 degree sensory system that detects wavelength patterns, regardless of illumination. A 3D array of sensors, with thousands of resistors recording redundant, overlapping signals, can detect fire signals from a radius of >10 miles. The cost of such an array is 1/10th of a camera; it is a robust system resilient to movement or precipitation.

In an embodiment, the sides of the vessel to which sensors are attached are configured to be directionally oriented at an angle of between 5° and 120° relative to each other. The angle at which a side is configured with respect to the other sides is chosen to allow detection of energy signals, and thus can be adapted to a particular wildland location, depending on the landscape, slope, vegetation, or other factors. The directional orientation of each side is continuously or periodically measured by onboard or distant orientation sensors. In this way, it is ensured that the direction of a reported energy signal is accurate. Because of low cost and onboard power, multiple MFD systems can be deployed to triangulate, validate, verify, and query reported energy signals.

In an embodiment, a predetermined "fire fingerprint algorithm" is applied to sensor data. Fire sources emit a unique radiation spectra in the MIR range, broadband but not random, which are used to generate an intelligent detection algorithm. A "fire fingerprint" of a small fire is determined, known to be much stronger for fires than other hot emitters. In an embodiment the MFD system retains the aggregated data from the resistors and sensors on each one of the multiple sides of a vessel as separate, distinct aggregated data. Noise cancellation techniques are applied to increase signal to noise ratios. Detected emission intensities from each of the aggregated sensor data streams are compared to the "fire fingerprint," and a fire may be detected.

In an embodiment at least one frequency filter is applied to the individual or aggregated resistor or sensor data. The at least one frequency filter detects and isolates at least one radiation spectrum range known to be associated with the radiation that fires emits.

An embodiment with multiple sides facing different directions produces IR energy pattern data as a single panoramic window stitched together, with dimensional reduction methods such as autoencoders to distinguish noise and increase a signal to noise ration. A further embodiment uses a reference dataset to isolate a signal, and continuously or periodically updates the reference dataset with the IR energy pattern data.

Given the infrared radiation of fire is a specific spectrum, an embodiment uses log periodic antennas, sized to be applicable for the expected wavelengths, to maximize energy incident on an infrared sensor. A log-periodic antenna is a broadband antenna with a series of dipoles whose length and separation decrease toward the emission direction. The design of a log-periodic antenna is fundamentally known, as described in U.S. Pat. No. 9,007,271 to Harscher et al. (P5). Another embodiment uses a transparent material that doesn't absorb in the infrared wavelength range as a lens to concentrate IR light on a sensor. Such materials include Yttrium Oxides and Yttrium Aluminum Garnet.

An embodiment uses polished flanges to reflect electromagnetic energy towards the aggregated sensors. An embodiment uses a polished cone surrounding the area approaching each plurality of sensors, thereby collecting electromagnetic radiation that funnels into the plurality of sensors.

The invention also includes methods of mounting the MFD system vessel to an infrastructure by providing a support system according to any of the embodiments of the invention.

According to the invention, the MFD system may be mounted to a tower or pole on which electrical transmission lines are linked, the MFD system preferably positioned near the top of the tower or pole, thereby increasing panoramic detection of IR radiation, and reducing the impact of animals. There is a great need to monitor the environment around such transmission lines for incipient fire events, which the MFD system can provide.

According to the invention, the MFD system may comprise a number of sections, to facilitate its mounting to the tower or pole.

In an embodiment the MFD system obtains operating power with an energy harvester that is proximal to an electrical transmission lines on the tower or pole. This may be a stable resource for the MFD system to operate without interruption. Such energy harvesters are known in the art (Riba, et al. 2022, 5. ) In a further embodiment the MFD system interacts with telephone lines that may be linked on the pole or tower. This may be a stable method for the MFD system to report signal detections.

In an embodiment the MFD system may be mounted on the tower or pole on a platform with electrically insulated supports. To prevent an electrical field from the tower or pole from entering the detection system, a plate may be secured under the MFD system, the plate extending away from the tower or pole on a boom or arm.

In the embodiment where the MFD system is composed of the plurality of sections, a first section may be the vessel that supports individual sensors and a second section may contain information processing hardware. In an embodiment the MFD system is operated by batteries disposed in a container. Thermoelectric sensors are energy efficient, operating off a small solar panel or infrequently replaced batteries. In an embodiment the MFD system is operated by a regenerative power system. This may include solar power, wind power, or triboelectrical power.

High voltage transmission lines may transmit electricity between locations at voltages above 50 to 765 kV. Transmission lines, when damaged or when their supporting structures fail, have been implicated in wildland fire generation. To avoid hazardous energized conductors, and prevent their voltage from influencing IR sensing, an embodiment mounts the MFD system on a boom or arm that extends to the side of a tower or pole. The boom or arm may be insulated, and have a plate to prevent untoward energy from influencing sensors.

In an embodiment the MFD system is mounted on its own pole or tower, with its own power source and communication system, such as an antenna.

In an embodiment the MFD system is mounted in a tall tree. In an embodiment the MFD system is attached to a pole attached to a tall tree. The pole is attached to a trunk, either at or above ground level. A goal may be to have the system 50 or 100 feet above the tallest trees in a forested area. Either the pole is that much longer than tree height, or it is attached above ground sufficiently to elevate the system that much.

In an embodiment more than one controller is used in the MFD system, as a first plurality of thermoelectic sensors is deployed in a first module, the first module oriented in a first direction, and at least one second plurality of thermoelectric sensors is deployed in at least one second module, the at least one second module oriented in at least one second direction, the first plurality of thermoelectric sensors configured to receive a first energy that contains that contains a first signal and a first noise, and the at least one second plurality of thermoelectric sensors is configured to receive at least one second energy that contains at least one second signal and at least one second noise, and a first controller is configured to receive the first signal and the first noise and uncorrelates the first signal as a first data output, and at least one second controller is configured to receive the at least one second signal and the at least one second noise and uncorrelates the at least one second signal as at least one second data output, and the first data output and the at least one second data output are received by at least one second controller that includes a sensor fusion algorithm that compares the first data output and the at least one second data output, and may also compare the first data output with a first typical data for the first direction, and may also compare the at least one second data output with an at least one second typical data for the at least one second direction, and may also compare the results of the comparison of the first data output and the at least one second data output with a comparison of the first typical data and the at least one second typical data.

There are a number of statistical methods to reduce noise and isolate a signal in the output of multiple thermocouples or multiple thermopiles that have the same orientation direction. Multiple data inputs can be represented as a grid with reductions to a mean. An idealized error grid, such as from a reference, may reveal mean errors due to insufficient averaging. Further transformation can apply a high-pass filter and a directional filter to the data. This enhances wavelength features considered to be mean errors; these may help isolate longer-wavelength IR signals. In an embodiment the controller regroups thermoelectric sensor IR energy pattern data in different groups, to calculate different transformations and comparisons that isolate signals of fire risk and heat surges.

Like the AlertCalifornia system, the MFD system's data can be communicated to a model trained to detect fire, that is housed in a management center. The MFD system is configured to increase signal/noise ratios and preprocess signals; it is not necessary that the system emit a continuous data stream to the management center. Only a threshold-exceeding signal, redundantly measured, may warrant communicating a warning signal.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTIONS

Figure 1:
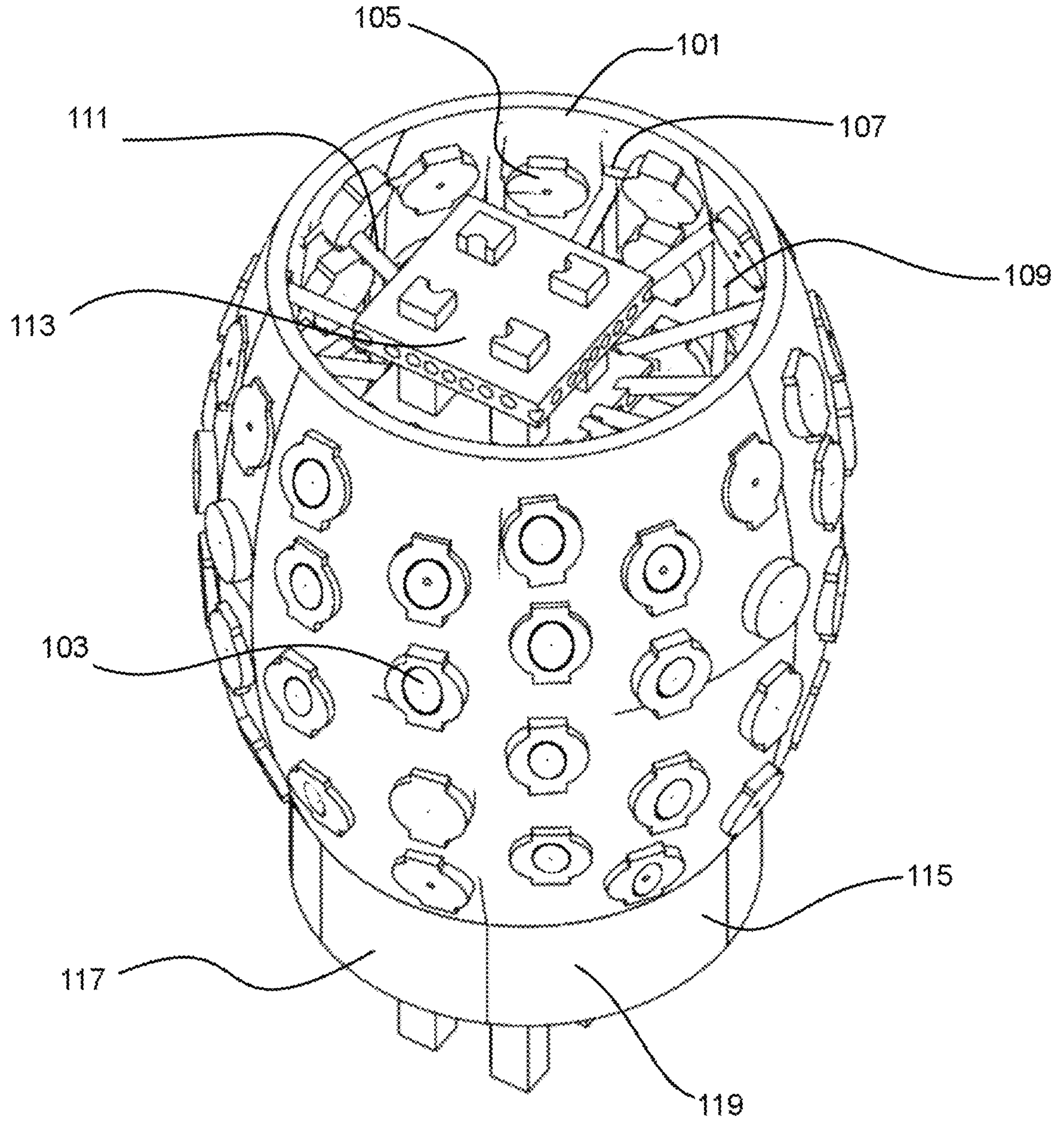
FIG. 1 is a perspective view of an MFD system vessel with thermoelectric sensors.

This invention is directed to a method and device for an MFD system with a vessel in which are positioned a plurality of thermoelectric sensors oriented in specific directions that provide data to sensor fusion algorithms that detect signals of fire risk and heat surges. Referring to FIG. 1, the vessel 101 has the front side of thermoelectric sensors 103 facing outwards, and the rear side of thermoelectric sensors

105 facing towards the vessel 101 interior. The thermoelectric sensors 105 are connected 107 to a controller 115 (not visible) contained in the vessel 101 along a vertical path 109 and to a direction management system 113 on a horizontal path 111. The direction measurement system 113 at the horizontal level determines the orientation of each thermoelectric sensor 103. The controller 115 includes a sensor fusion algorithm. A power input 117 (not shown) and communication system 119 (not shown) are contained in the vessel 101. thermoelectric sensors do not consume energy, they generate small amounts. Limited power from an onboard or remote power source is needed as the power input 117 to operate controller 115 processing and to manage the communication system 119. Vessel 101 can be positioned on any infrastructure, by mounting it next to a pole, girder, bar, or other structure.

Figure 2:
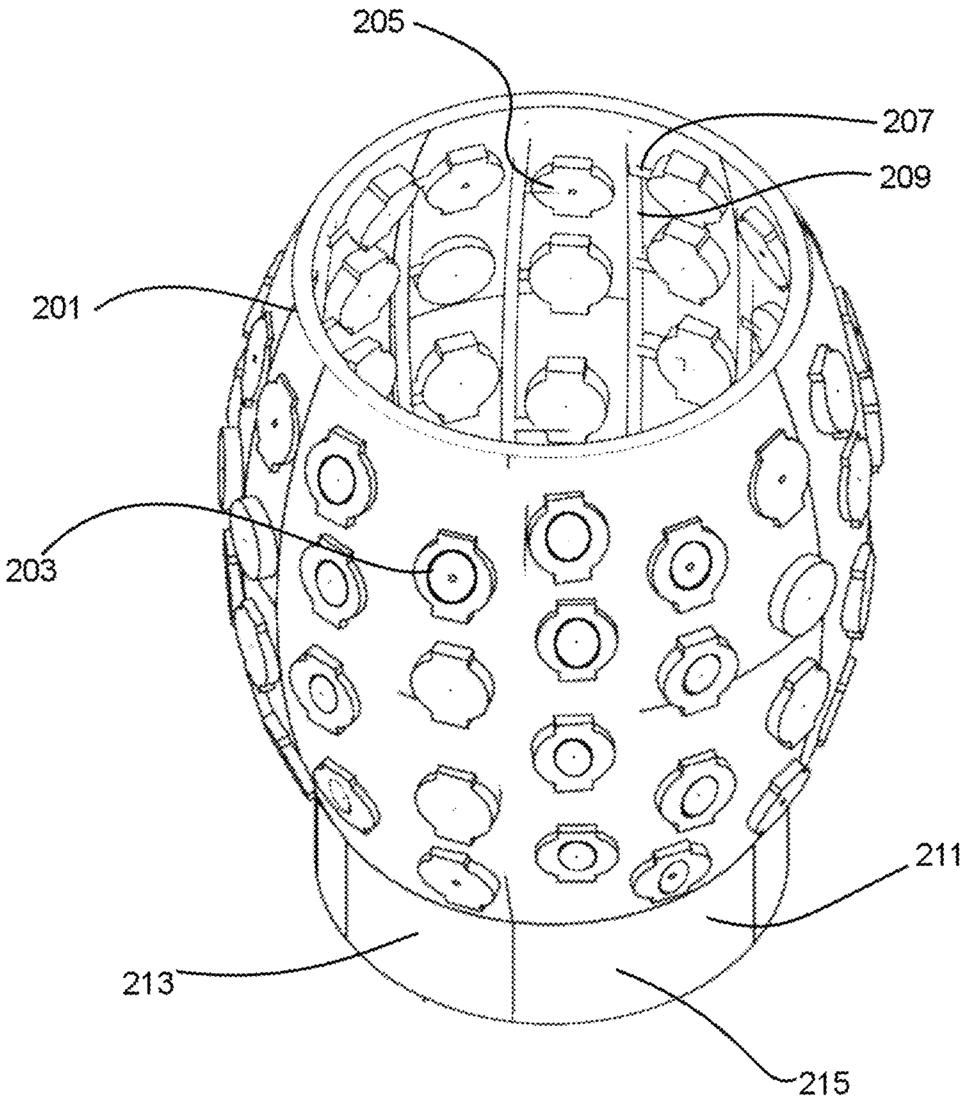
FIG. 2 is a perspective view of an MFD system vessel configured to fit around an infrastructure.

In FIG. 2 the vessel 201 is designed to fit around an infrastructure such as a pole, therefore it has a configuration with an empty area in the middle. The outward face of thermoelectric sensors 203 face specific orientations, and the inward face of thermoelectric sensors 205 are linked 207 to conduits 209 that carry data streams to a controller 211 (not shown) contained in the vessel 201. A power input 213 (not shown) and communication system 215 (not shown) are contained in the vessel 201.

Figure 3:
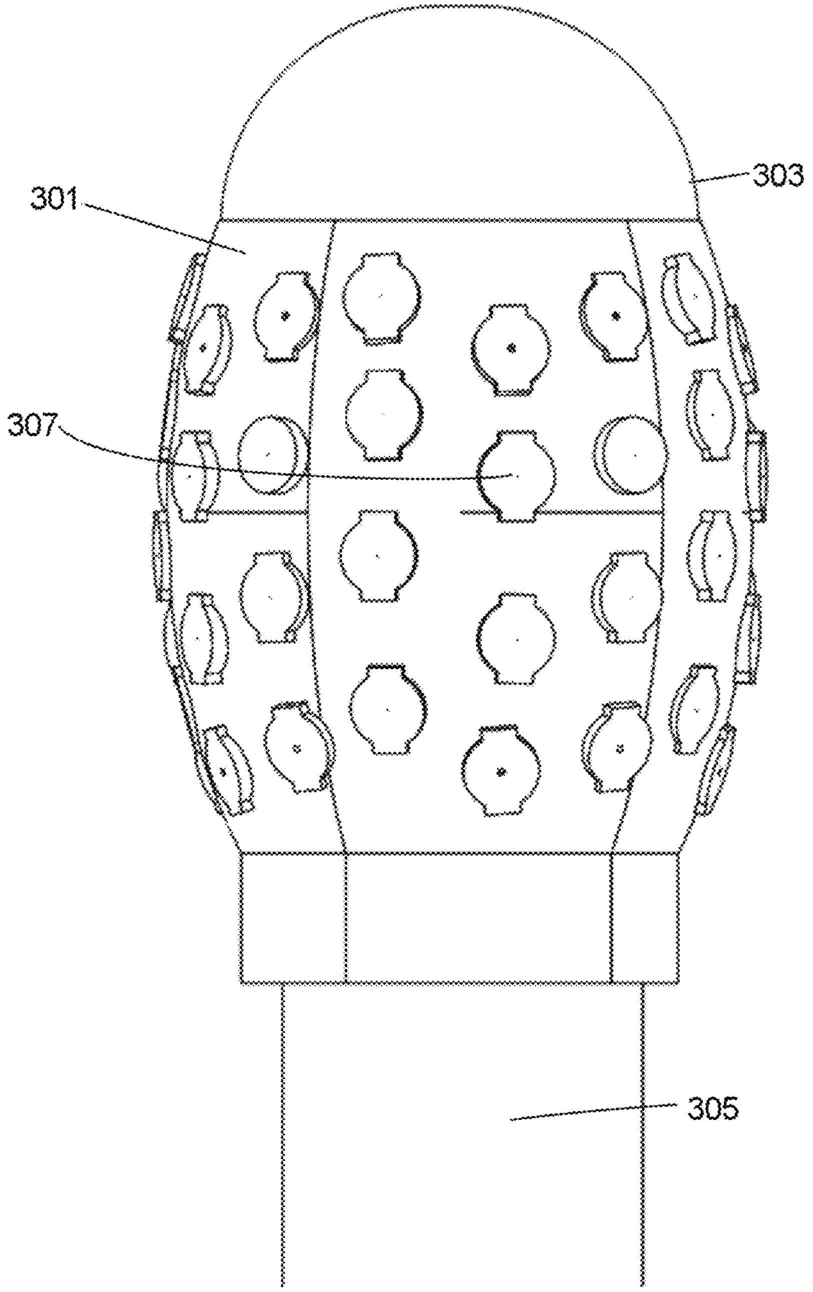
FIG. 3 is a perspective view of an MFD system vessel mounted on an infrastructure.

In FIG. 3 the vessel 301 with a cover 303 is mounted onto a pole 305. The outward face of thermoelectric sensors 307 produce data streams, as described with reference to FIG. 2.

Figure 4:
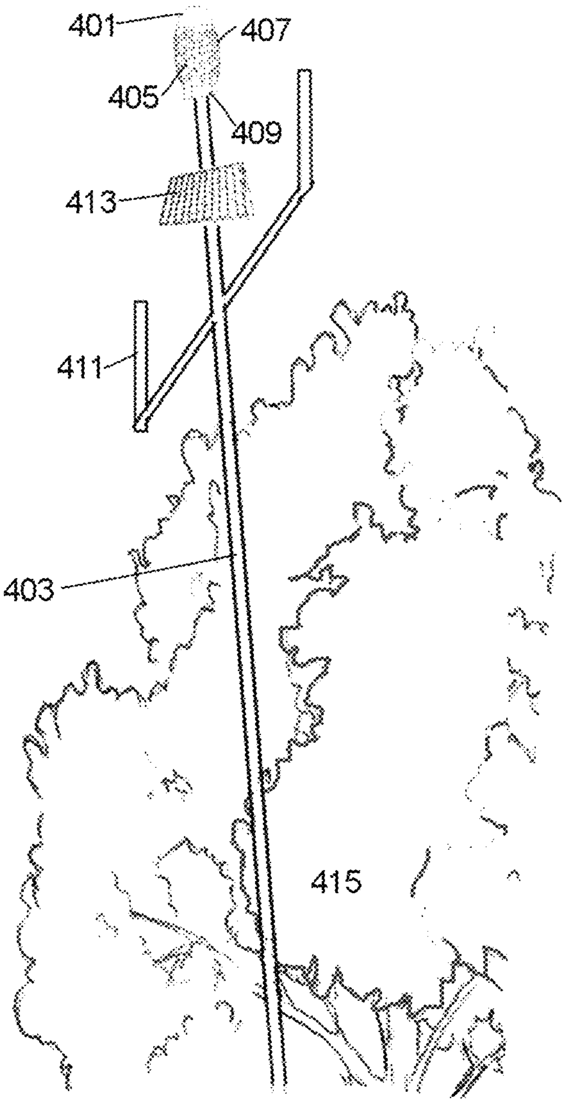
FIG. 4 is a perspective view of an MFD system deployed on an infrastructure.

In FIG. 4 the MFD system includes a vessel 401 mounted on any suitable type of pole or tower 403 that allows the vessel 401 to be elevated into the air where it can detect IR energy from distant locations, such as in the range of 1 to 10 kilometers. The fire risk or heat surge detection system operates in two primary modes, a comparative mode in which each thermoelectric sensor 405 data stream is compared to other thermoelectric sensor 407 data streams, and a baseline mode in which each thermoelectric sensor data stream 405 is compared to a stored data for that orientation. Each primary mode, and orientation data from a direction management system, is processed in a controller 409 which utilizes embedded computers and/or microcontrollers, and produces an output data. The embedded computers and/or microcontrollers may be distributed with none or part of the functionality at the vessel 401 and all or part in a distributed network. Data streams and output data may be communicated on this distributed network for further processing, or to communicate one or more signals, such as with an antenna 411, which may link to a telephone network, a wireless network, a satellite network, the Internet, an intranet, or other suitable communications network. The MFD system is powered by a solar energy panel 413. The pole or tower 403 may be attached to a tree 415.

Figure 5:
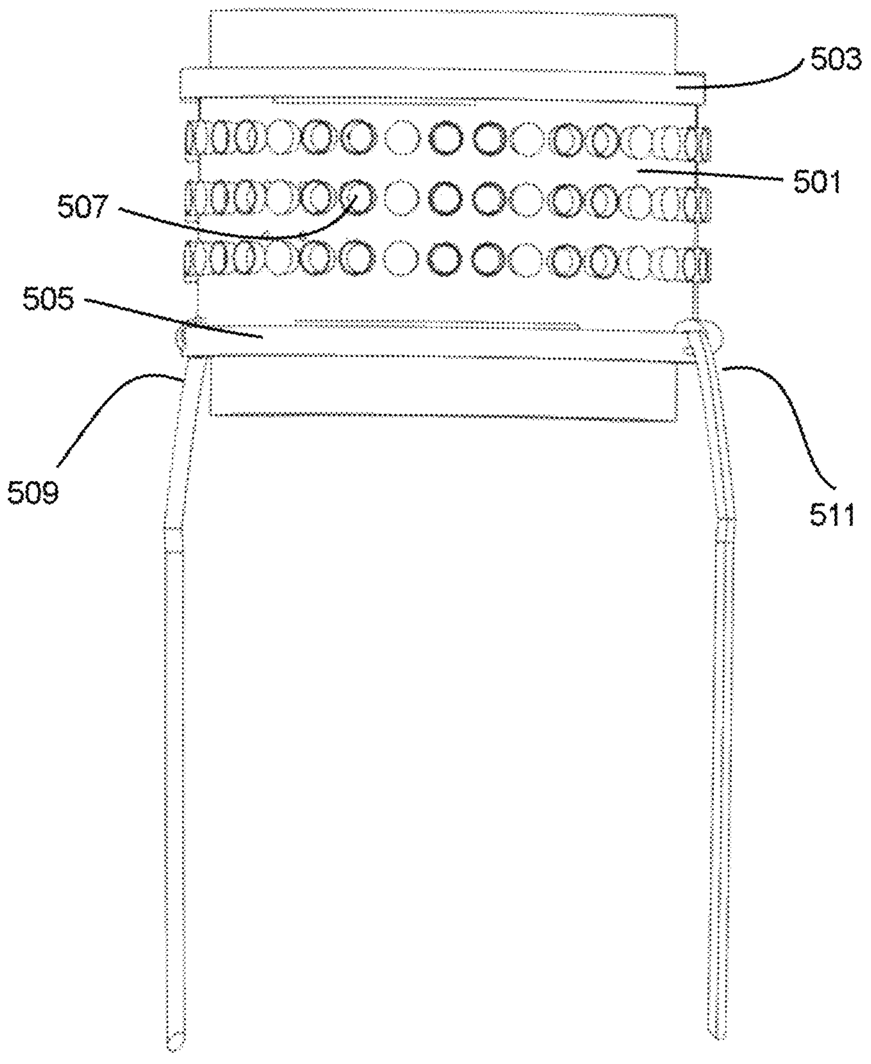
FIG. 5 is a perspective view of an MFD system for use with transmission infrastructure.

In FIG. 5 the MFD system intended for mounting on a pole or tower comprises a vessel container 501, having attachment brackets 503, a tubular portion 505, a plurality of thermoelectric sensors 507, and lines interconnected to a communications system 509 and a power system 511.

Figure 6:
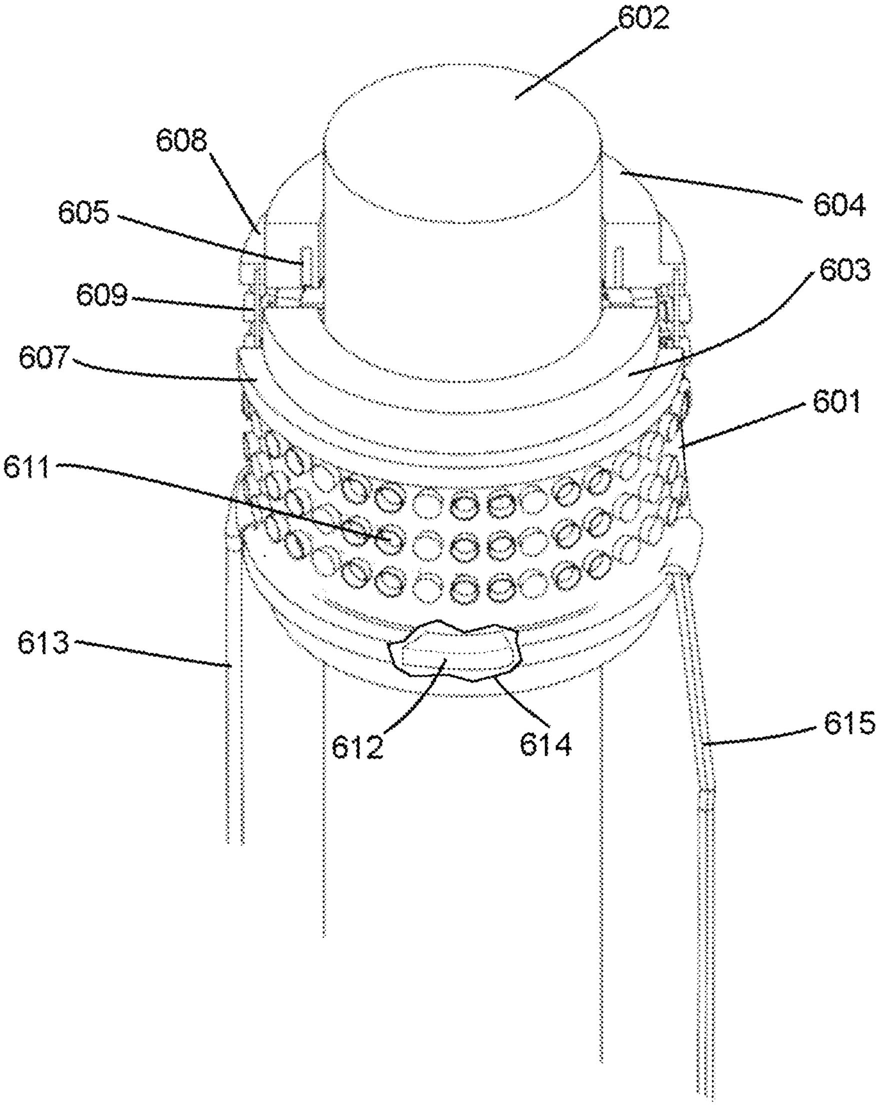
FIG. 6 is a perspective view of an MFD system for use with transmission infrastructure.

In FIG. 6 the vessel container 601 is releasably positioned to a pole 602 via a pair of brackets 603 and 604. In the illustrated embodiment, each bracket 604 has a receptacle groove 605 configured for mating engagement with corresponding lips on bracket 603 (not shown) on bracket 603. Bracket 603 is supported by a flange 607; bracket 604 is supported by a flange 608. The flange 608 holds a lock-and-release mechanism 609 by means of which the brackets may be attached when the vessel is mounted. The plurality of thermoelectric sensors 611 produce a data stream which may be transmitted via a conduit 613 to a communication system (not shown) or the data stream may be processed by an on-board controller 612 seen in cutaway 614. Power to operate the controller 612 and any other processes in the fire detection system arrives via conduit 615.

Figure 7:
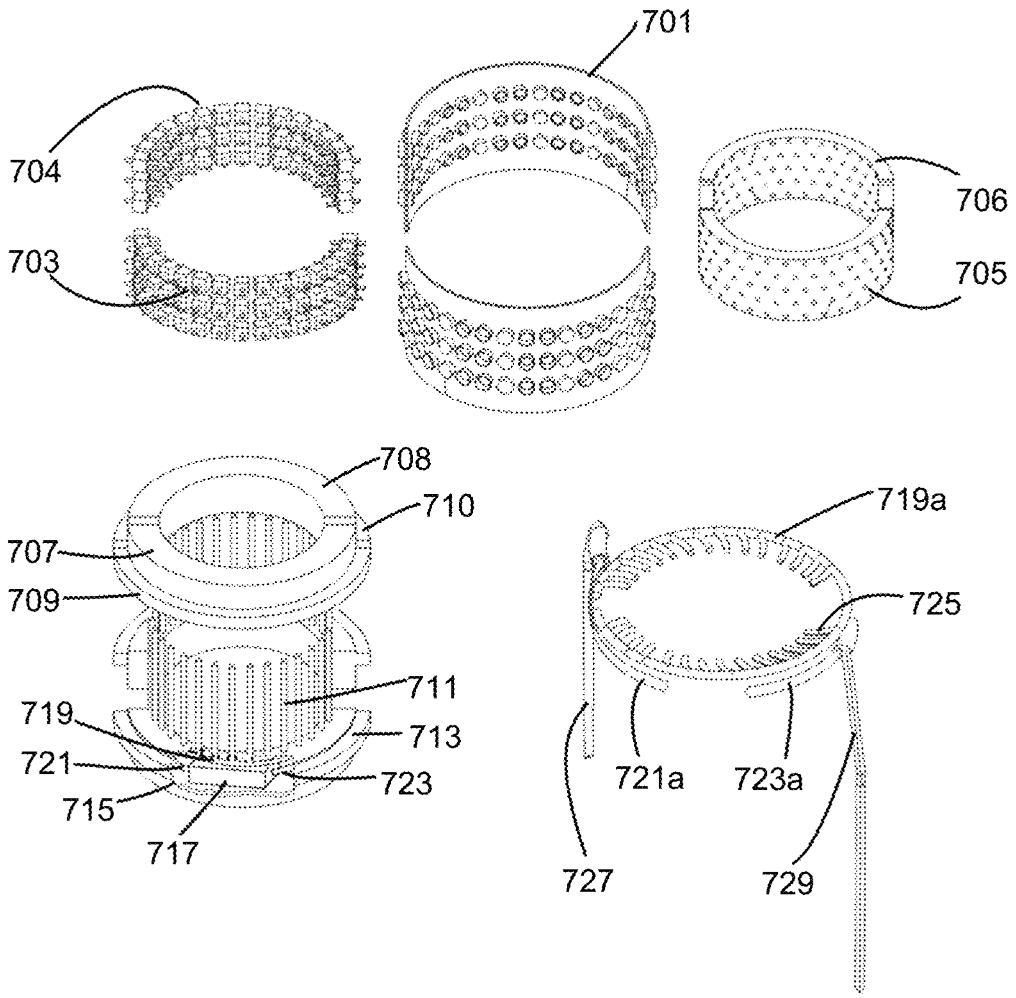
FIG. 7 is a perspective view of individual components in an MFD system.

In FIG. 7 the vessel container 701 has been deconstructed so as to disclose the arrays of thermoelectric sensors 703 and 704, and the sensor holding structures 705 and 706. The brackets 707 and 708, the flanges 709 and 710, and the array of sensor feedback lines 711 are shown. Part of the bottom tube 713 has been removed 715 to disclose a controller 717, sensor line connector 719, and conduit connectors 721 and 723. The sensor line connector 719*a* is shown with elements 725 that connect to sensor feedback lines, as illustrated at 711. Shown are conduit connector 721*a* to communication conduit 727 and conduit connector 723*a* power conduit 729.

Figure 8:
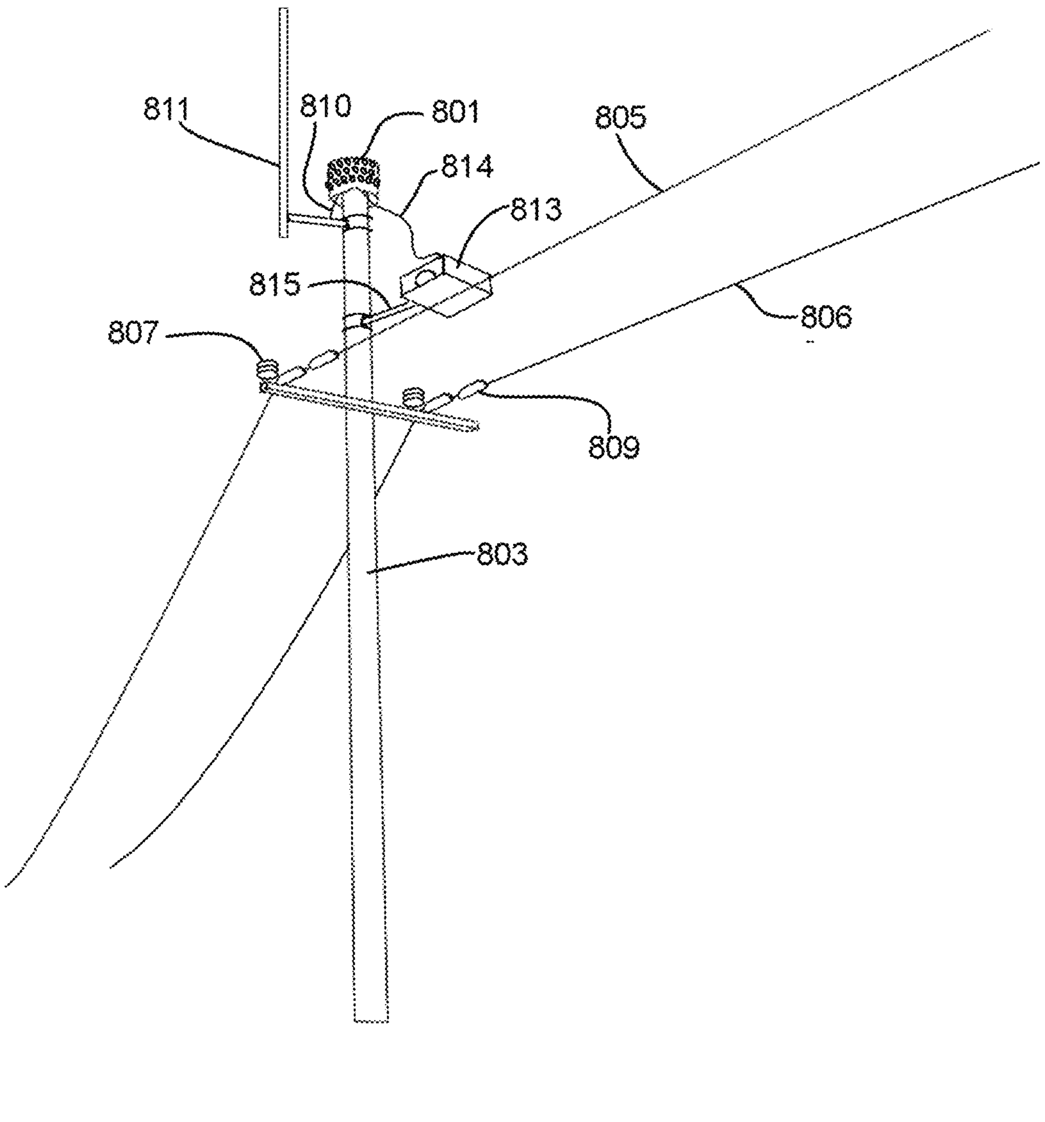
FIG. 8 is a perspective view of an MFD system deployed on a transmission infrastructure.

FIG. 8 illustrates an MFD system 801 mounted on a pole 803 on which electrical transmission lines 805, 806 are linked.

Such a pole may be any conventional electrical transmission infrastructure, such as a metal transmission tower, a wood pole, or a structure made from concrete or composites, whereby the infrastructure may have conductors, insulators 807, Stockbridge dampers 809, and transformers thereon, and also other forms of transmission lines, such as for telephone or internet, as well as antennas for cell phones. Electrical transmission lines typical have a unique power-handling capacity and the heights of poles and transmission towers varies accordingly. Electrical transmission lines carrying higher voltages may induce greater concern for fire risk and heat surges; because these towers are higher, the MFD system mounted on them will have a greater panoramic extent of IR energy detection. In the United States standard utility poles are around 35 ft (10 m) in height and are often spaced 300 ft (100 m) apart in non-urban areas. MFD systems will reliably detect fire risk and heat surges over this distance, from that height.

FIG. 8 illustrates MFD system 801 interconnected 810 to an antenna 811 used by a communication system to transmit and receive data concerning the MFD system's operations and results. An electric field energy harvester 813 attached to a boom arm 815 harvests power from its proximity to an electrical transmission line and connects 814 to the MFD system 801, providing the minimal operating power needed. Such energy harvesters are known in the art. Direct power may also be provided by a battery source and/or by a solar cell or any other regenerative power feed available where the MFD system is located.

Figure 9:
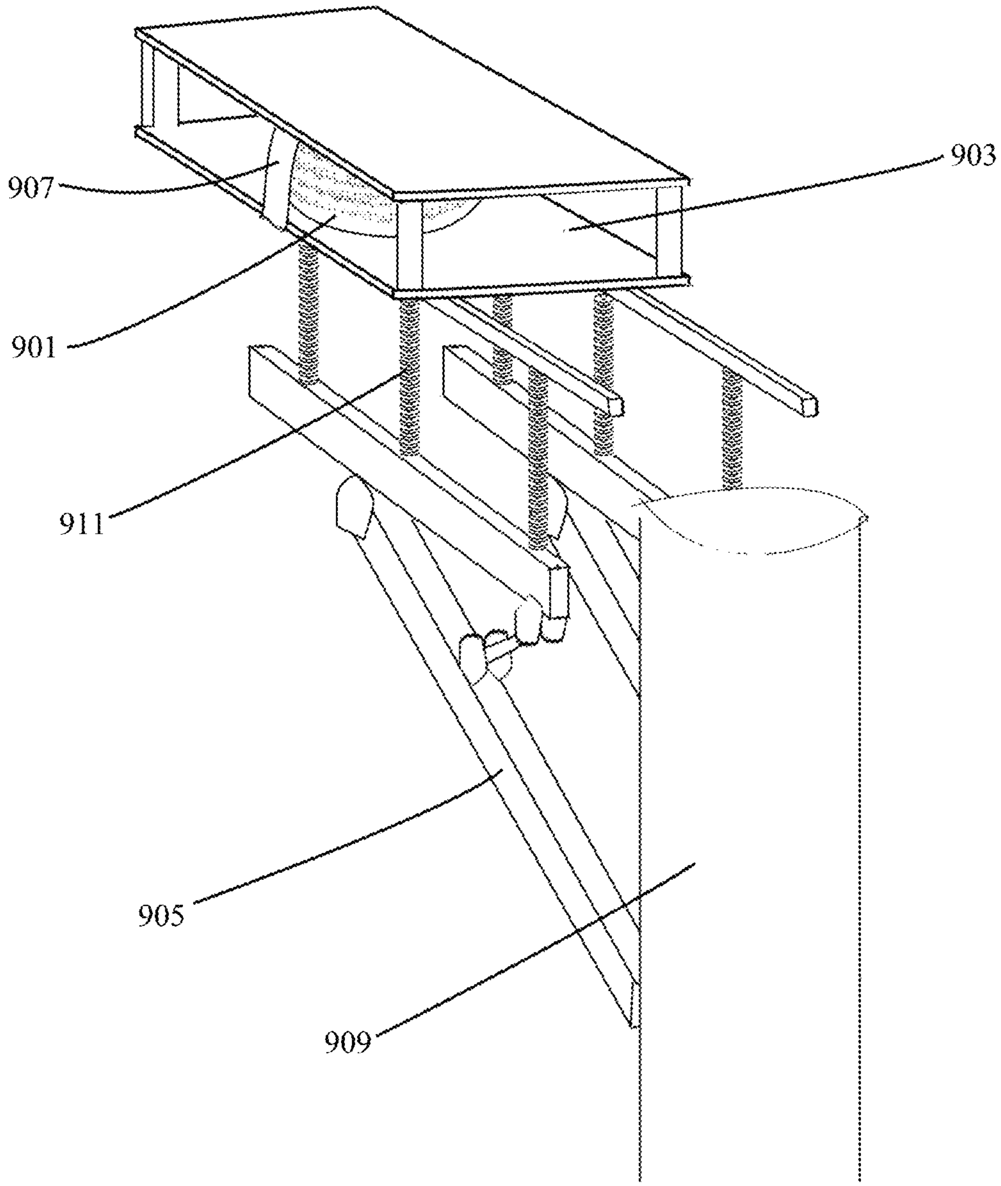
FIG. 9 is a perspective view of an MFD system mounted on a boom.

FIG. 9 demonstrates a mounting apparatus for an MFD system 901, with an extend system for securing the MFD system on a platform 903 with arm mechanisms 905 to extend the MFD system 901 away from an infrastructure 909, securing the MFD system 901 with latches 907 or other securing structures, to house the MFD system without interference by and of an infrastructure 909 or infrastructure components, such as guy wires, electrical connectors, and other components found on utility poles, electrical transmission towers, and other natural and man-made structures. Specifically the platform is insulated from electric influence by arrays of insulators 911.

Figure 10A:
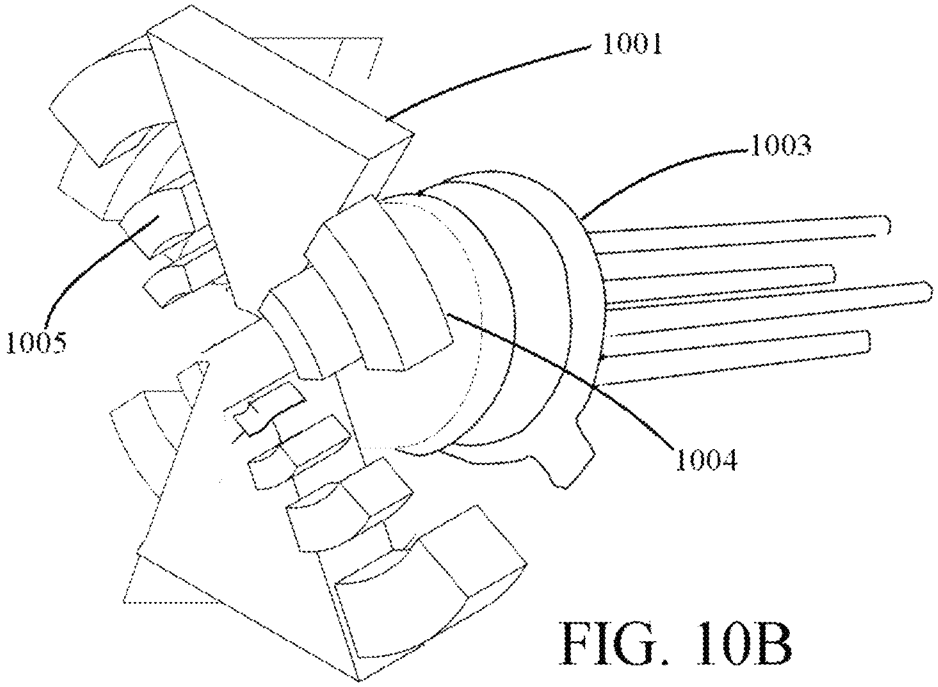
FIG. 10A is a perspective view of a log-periodic antenna to amplify energy in an MFD system.

FIG. 10A shows an antenna design of a log-periodic antenna 1001, which may be from 1 to 20 mm in diameter, or may be less than 1 mm in diameter, connected at one end to a sensor detector 1003 input face 1004 located at the vertex of the antenna. Transmitting elements 1005 to receive and transmit electromagnetic signals are manufactured from a conductive and corrosion-resistant material. The size and coupling of the transmitting elements 1005 is carried out in accordance with rules which are known by a person skilled in the art.

Figure 10B:
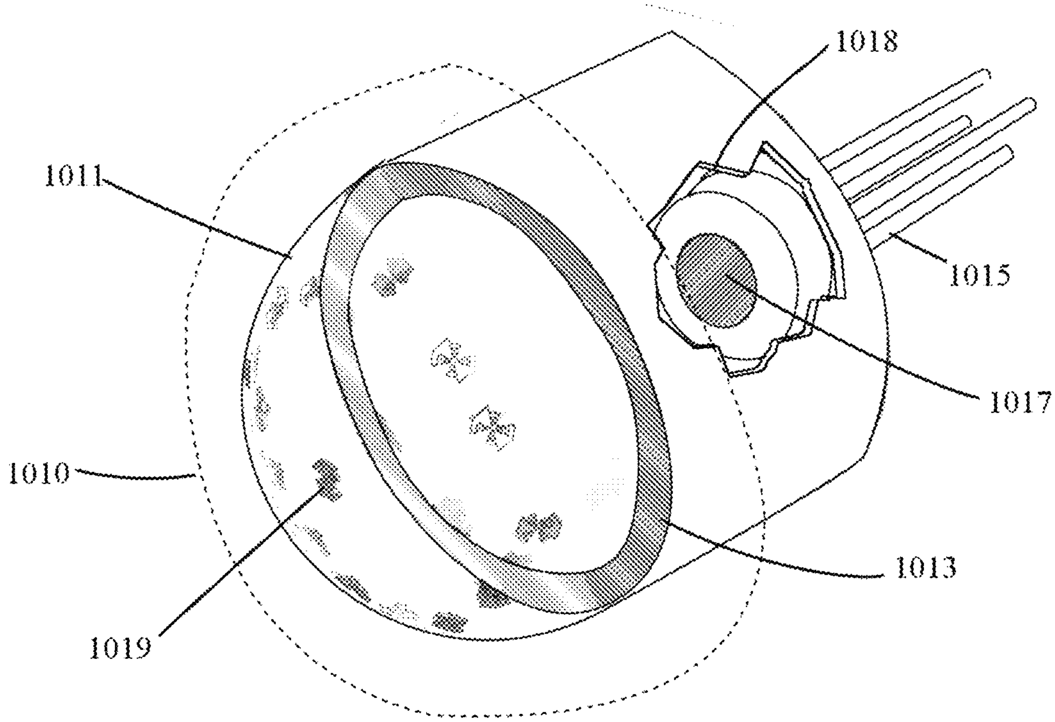
FIG. 10B is a perspective view of a lens to concentrate energy in an MFD system.

FIG. 10B shows a lens unit 1010 for a thermoelectric sensor 1015, that includes a lens element 1011 held by a support means 1013 in a plane parallel with the thermoelectric sensor 1015. The front face 1017 of the thermoelectric sensor 1015 is seen in cutaway 1018 on the support means 1013. Lens element 1011 is made from materials that do not absorb IR energies in the wavelengths used to detect fire risk and heat surges. Lens element 1011 incorporates antenna units 1019 that increase transmission of IR energies to the thermoelectric sensor 1015.

Figure 11A:
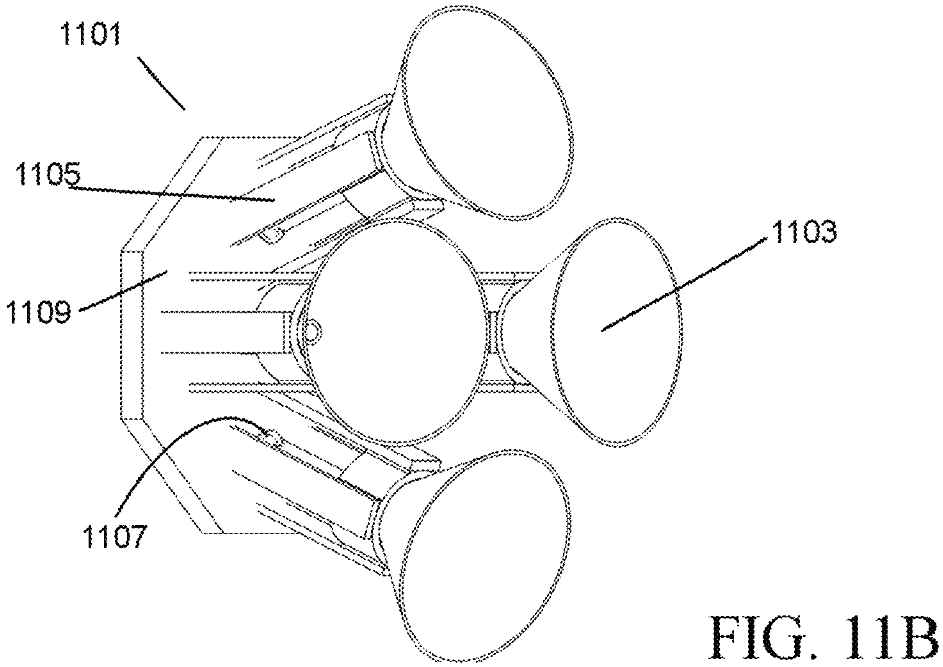
FIG. 11A is a perspective view of an MFD system module with cone shaped reflectors.

FIG. 11A shows an MFD system module 1101 with polished flanges in a cone shape 1103 secured with attachments 1105, each cone shape 1103 over a group of thermoelectric sensors 1107 to which the flanges reflect IR energies. Attachments 1105 are secured to base 1109. Base 1109 has a shape amenable to assembly with other similar MFD system modules.

Figure 11B:
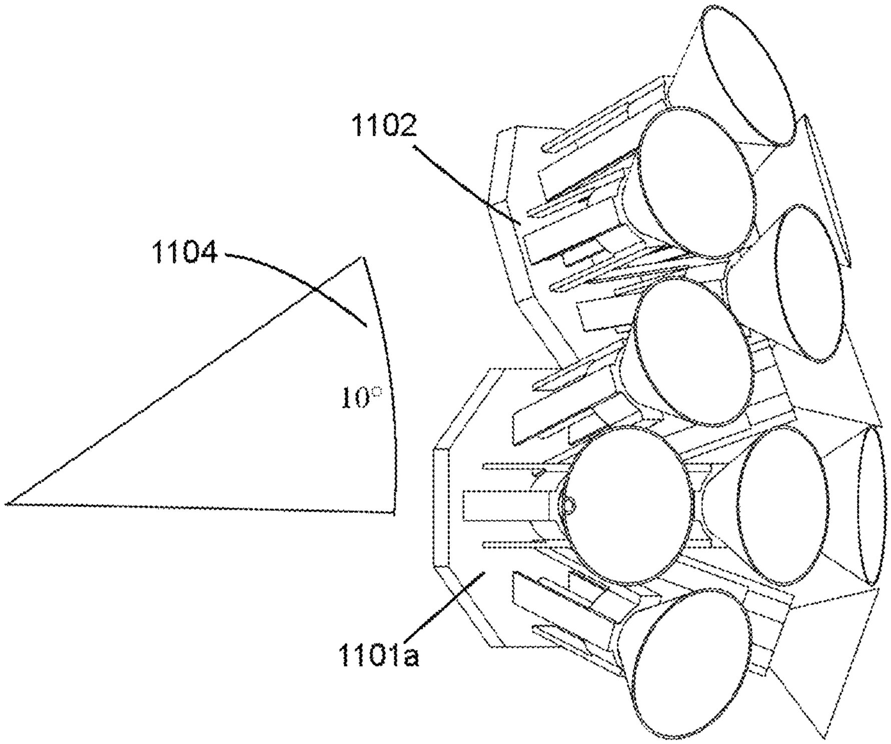
FIG. 11B is a perspective view of several MFD system modules assembled together.

FIG. 11B shows MFD system module 1101*a*, which is the same as MFD system module 1101 from FIG. 11A, assembled with a second MFD system module 1102, arranged with the face of each module having an angle of 10° relative to each other 1104.

Figure 12A:
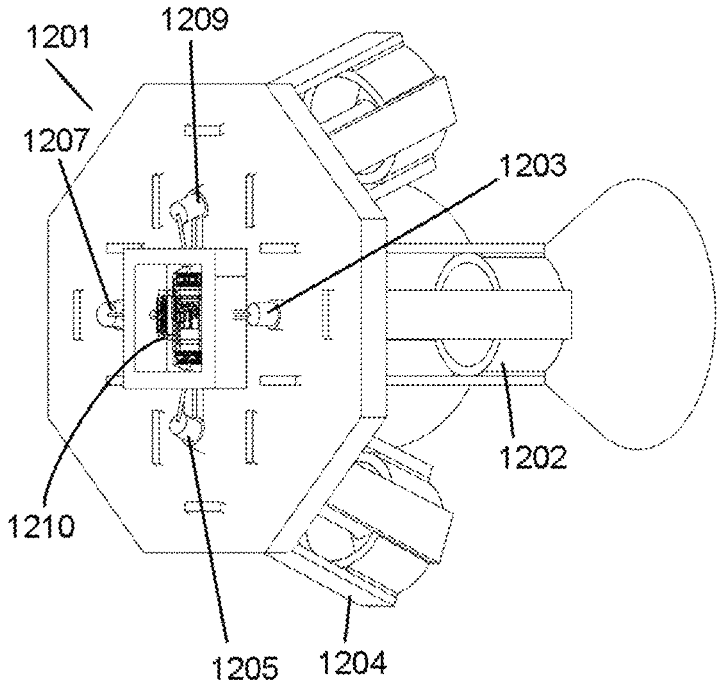
FIG. 12A is a perspective view of the rear of an MFD system module.

FIG. 12A shows an MFD system module 1201 from the rear, a data stream from a first plurality of thermoelectric sensors disposed on the MFD system module in a first direction, as shown by a plurality of attachments 1202 secured to the base pointing in the first direction, is received by a controller 1210 via a first link 1203, and a data stream from a second plurality of thermoelectric sensors disposed on the MFD system module in a second direction, as shown by a plurality of attachments 1204 secured to the base pointing in the second direction, are input to the controller via a second link 1205; there are a third plurality and a fourth plurality of thermoelectric sensors disposed on the MFD system module in a third and a fourth direction, respectively, and a received data stream from the third plurality are input to the controller via a third link 1207, and the fourth plurality are input to the controller via a fourth link 1209.

Figure 12B:
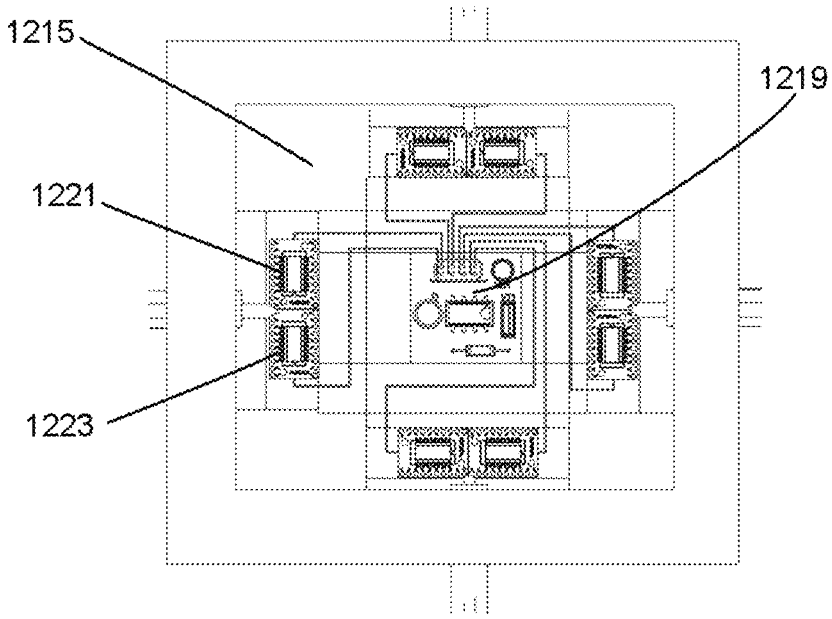
FIG. 12B is a perspective view of an MFD system controller.

FIG. 12B shows an MFD system module controller 1215 that performs signal processing to compare the different data streams by using a sensor fusion algorithm, compares the different data streams with an orientation system data, and compares the different data streams to typical data for each direction. The controller is configured with, for example, a computer processing unit (CPU) 1219, a read-only memory (ROM) 1221, a random-access memory 1223, and the like, and these functions are achieved by the CPU executing a program stored in the ROM. Note that each function of the controller 1215 may be achieved by hardware such as a field-programmable gate array.

Figure 13:
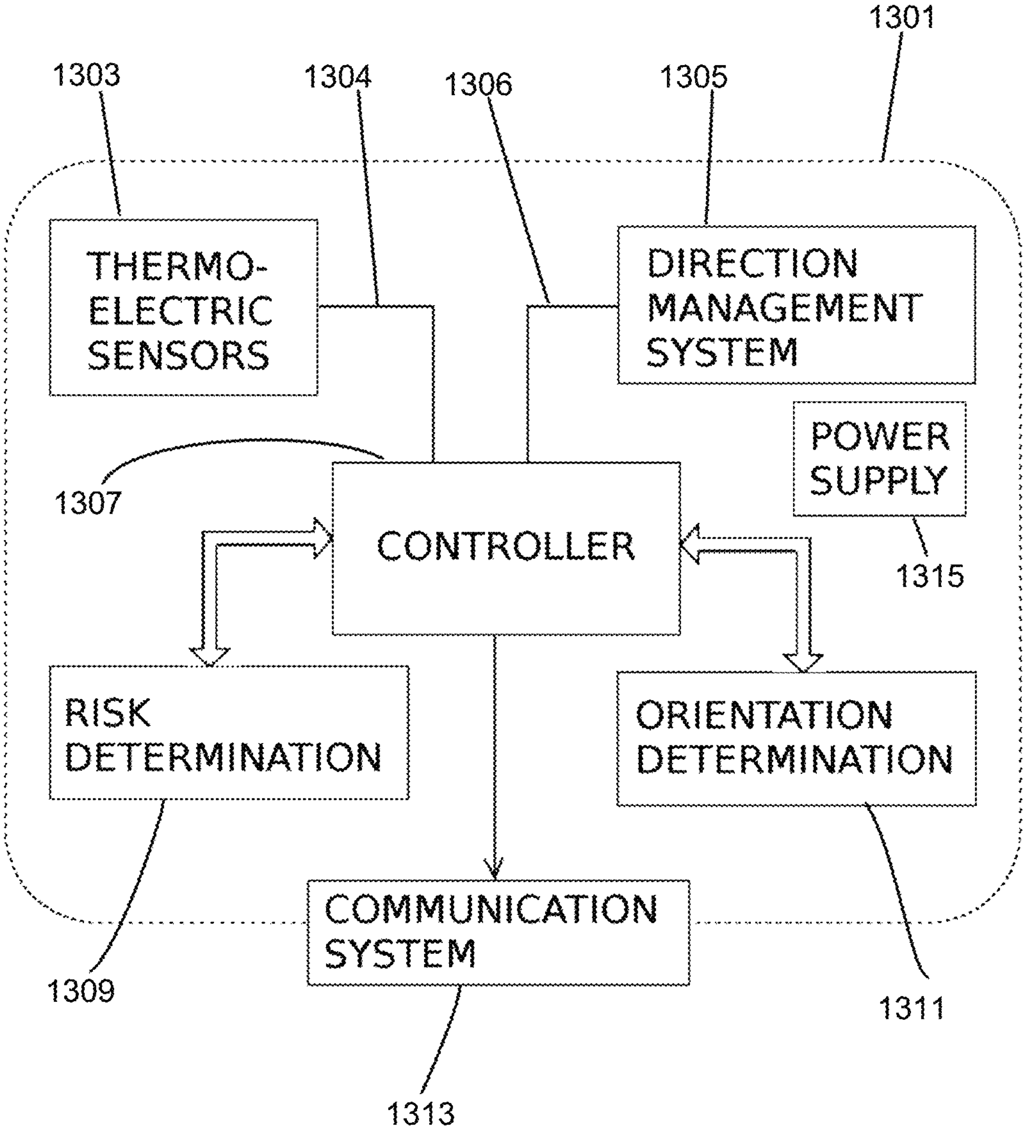
FIG. 13 is a flow-chart description of an operation of an MFD system.

As illustrated by FIG. 13 for disclosed embodiment, MFD system 1301 is provided in accordance with an exemplary embodiment of present technique. MFD system 1301 is similar to MED system illustrated in FIG. 1 through FIG. 12AB, including similar mechanical, electrical, sensor hardware and/or software components. The depiction of FIG. 13 is a detailed diagram showing various internal components of the MFD system 1301, from which various modifications of those internal components can be housed and/or used by the MFD system 1301, as appreciated by those having ordinary skill. Accordingly, MFD system 1301 includes thermoelectric sensors 1303 adapted for detecting IR energies. Themoelectric sensors 1303 may further be adapted for filtering (sampling, amplifying, etc.) IR energies. The MFD system 1301 may further include a direction management system 1305 adapted for determining thermoelectric sensor orientation. MFD system 1301 further includes connectors 1304 between thermoelectric sensors 1303 and a controller 1307, to provide an IR energy pattern data stream. MFD system 1301 may further include connectors 1306 between direction management system 1305 and controller 1307, to provide an orientation data.

MFD system 1301 controller 1307 further processes risk determination algorithm 1309 adapted for use in IR energy pattern data sensor fusion, and associates IR energy pattern data streams with orientation data in sensor orientation determination 1311. For example, if the algorithm 1309 receives an IR energy pattern data stream indicating a fire risk or heat surge, comparison with prior stored typical IR energy pattern data for that orientation, and/or comparison with other IR energy pattern data streams from other thermoelectric sensors facing other orientations, triggers a warning signal that may be transmitted via communication system 1313. MFD system 1301 may include an wavelength detector that operates regardless of visibility, and methods to stabilize incoming IR energies, as appreciated by those having ordinary skill in the art. MFD system 1301 further includes power supply 1315.

The present invention is not limited to the above described embodiments, and it goes without saying that various modifications can be made without departing from the scope of the invention. For example, in the above described embodiments, the MFD system is mounted on infrastructure such as utility poles, transmission towers, and on stand-alone poles; however the present invention is not limited thereto, but can be employed in any circumstance for which a low-cost, long-range detector of fire risk and heat surges are desired. MFD vessels may be placed on the ground, or in trees, or employed in balloons, drones, or other airborne systems. The MFD system may be deployed anywhere that an inexpensive, energy-efficient, long-distance detector of fire risk and heat surges is needed, including industrial sites, educational sites, institutional sites, transportation corridors and lines, airports, suburban and rural communities, and other places.

The invention claimed is:

1. A method of providing a warning signal of a fire risk or heat surge, comprising:

a vessel with at least a first side oriented in a first direction, and at least a second side oriented in a second direction;

positioning a plurality of thermoelectric sensors, each sensor composed of a plurality of resistors, in the at least first and the second sides;

the plurality of thermoelectric sensors in the at least first side being oriented in the first direction;

the plurality of thermoelectric sensors in the at least second side being oriented in the second direction;

collecting a data output from the plurality of resistors and the plurality of thermoelectric sensors from the at least first and the second sides in a controller;

processing the data output in a sensor fusion algorithm in the controller to generate an initial estimation of a probability of a fire risk or heat surge;

if the probability estimation is above a threshold, providing the warning signal.

2. The method of claim 1, wherein the sensor fusion algorithm conducts spectral analysis of a plurality of wavelengths of the data outputs.

3. The method of claim 1, wherein the vessel includes a direction measurement system providing orientation data to the controller.

4. The method of claim 1, wherein the at least first side and the second side of the vessel in which the plurality of thermoelectric sensors are positioned are configured to be directionally oriented at an angle of between 10° and 120° relative to each other.

5. The method of claim 1, wherein at least one frequency filter is applied to the data output.

* * * * *